July 4, 1944. E. C. JOHNSTON ET AL 2,352,839
APPARATUS FOR ENROBING CONFECTIONS WITH CHOCOLATE
Filed Nov. 27, 1941 2 Sheets-Sheet 2
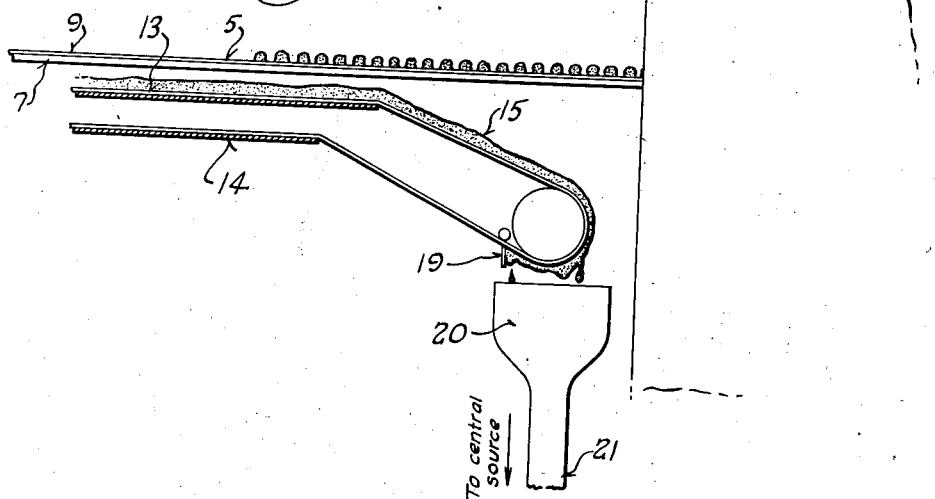
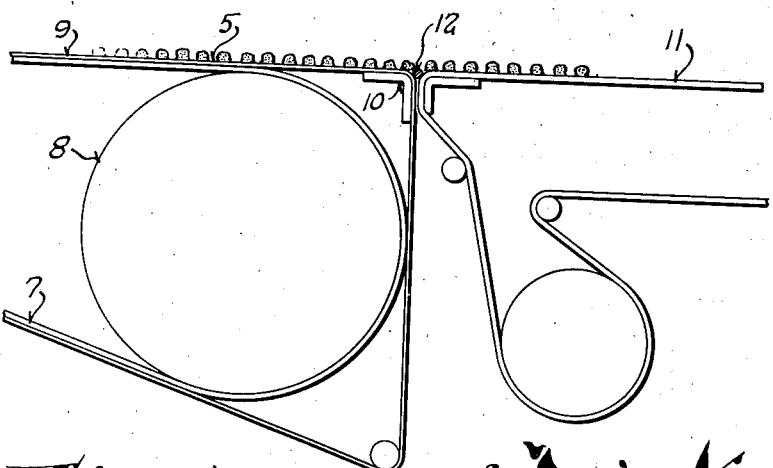
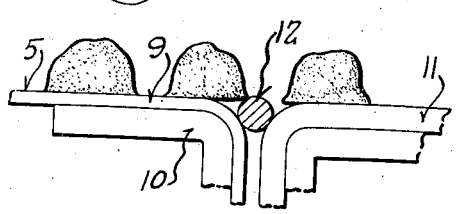
Inventors
Edward C. Johnston
Nevin J. Russell
Robert M. Jameson Patented July 4, 1944

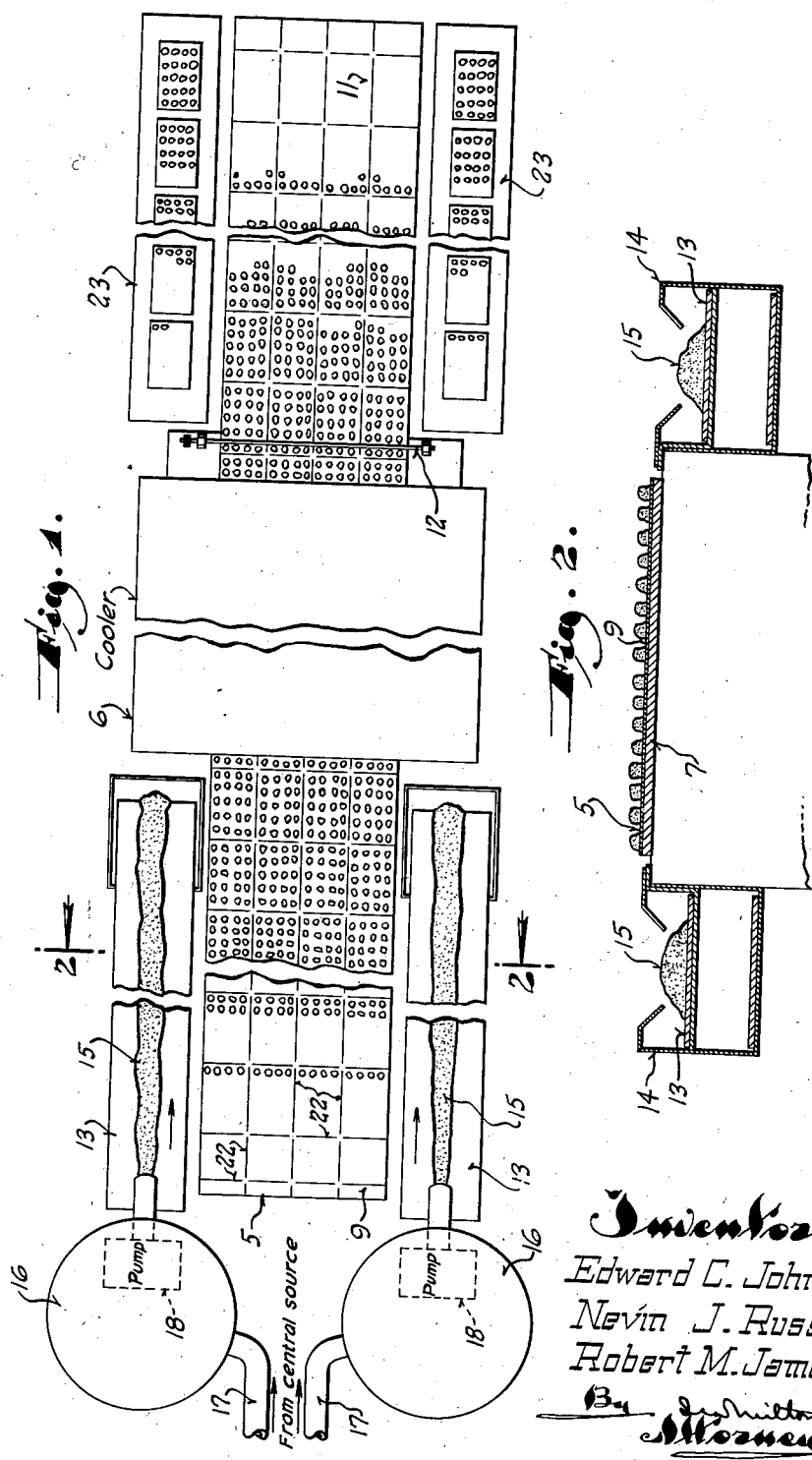

2,352,839

UNITED STATES PATENT OFFICE 2,352,839

APPARATUS FOR ENROBING CONFECTIONS WITH CHOCOLATE

Edward C. Johnston, Nevin J. Russell, and Robert M. Jameson, Milwaukee, Wis., assignors to Robert A. Johnston Company, Milwaukee, Wis., a corporation of Wisconsin Application November 27, 1941, Serial No. 420,682

3 Claims. (Cl. 91—2)

This invention relates to the manufacture of candy and refers more particularly to enrobing methods and apparatus.

In the enrobing of confections with chocolate, the chocolate should be maintained at a predetermined "temper" as it is known in the industry. This state or condition involves the various factors known to candy makers, as for instance, the consistency of the chocolate. However, notwithstanding the need for maintaining the chocolate at a uniformly proper "temper," past methods and apparatus used for the enrobing of candy and other confections required each girl or operator to maintain her own supply of tempered chocolate. Hence, the temper of the chocolate used was subject to the discretion of each individual operator. Lack of uniformity in the finished product was thus inevitable.

Moreover, with these past methods, approximately twenty per cent of the operator's time was spent in the unproductive handling of chocolate and trays.

It is therefore an object of the present invention to provide an improved method and a new apparatus for carrying out the enrobing of candies and other confections with chocolate whereby uniform results are assured and the operators are enabled to devote their entire time to actual dipping.

This invention has as another of its objects to provide an apparatus for the purpose described wherein the dipped or enrobed pieces of candy or other confection are assembled on a continuous or endless conveyor arranged in sections or defined areas each of which is intended to hold a complete assortment to thus facilitate packaging.

With the above and other objects in view, which will appear as the description proceeds, this invention resides in the novel method and in the novel combination and arrangement of mechanical expedients for carrying the same into effect, substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention, constructed in accordance with the best mode so far devised for the practical application of the principles thereof, and in which:

Figure 1 is a top plan view illustrating diagrammatically one embodiment of this invention;

Figure 2 is a cross-sectional view taken through Figure 1 on the plane of the line 2—2.

Figure 3 is a detail view illustrating part of the apparatus in side elevation and showing the manner in which the chocolate used for the enrobing is returned to a central source of supply;

Figure 4 is a view similar to Figure 3 but showing another portion of the apparatus to illustrate the manner in which the finished candy or confection is transferred from one conveyor to another; and Figure 5 is an enlarged detail view of this latter portion of the apparatus.

Referring now particularly to the accompanying drawings in which like numerals indicate like parts, the numeral 5 designates an endless conveyor suitably mounted and driven to have its upper stretch travel along substantially a horizontal path which extends through a cooling tunnel indicated generally by the numeral 6.

The conveyor 5 comprises briefly a heavy apron 7 which constitutes the driving and main supporting portion of the conveyor and which is suitably supported and trained over a drum 8 adjacent to the outlet of the cooling tunnel, and an outer thinner apron 9 supported on the main carrying apron. The apron 9 has a glazed outer surface so that candy will not readily adhere to it.

Adjacent to the drum 8 the outer apron 9 travels ahead in a straight tangent line to pass over a sharp corner 10 so that the candy carried thereby may be transferred to a delivery conveyor 11, the transfer being facilitated by a roller 12 at the junction of the two conveyors as best shown in Figure 5.

The conveyor 5 provides a carrier for the dipped or enrobed pieces of candy or confection, which are deposited thereon by the operators who sit in rows along the length of the conveyor. Along each side of the conveyor 5 is a chocolate carrying conveyor 13. These latter conveyors may be of any suitable construction, as for instance endless belts trained over pulleys or drums, and suitably supported along their upper and lower stretches to have at least their upper stretches travelling along substantially horizontal paths at opposite sides of the conveyor 5.

As best shown in Figure 2, the top stretches of the conveyors 13 have guard structures 14 built around them. These guard structures have marginal edge portions extending down over the upper edges of the top stretches of the conveyors 13 so as to form troughs.

Being located adjacent to the side edges of the conveyor 5 these troughs are positioned between the conveyor 5 and the operator's stations.

Each conveyor 13 is adapted to have properly tempered chocolate 15 deposited thereon to form substantially a continuous river or stream of chocolate travelling down the trough extending along each side of the conveyor 5. The operators thus merely dip the pieces of candy or other confection into this river or stream of properly tempered chocolate and place the same on the conveyor 5.

The chocolate deposited on the conveyors 13 is discharged from tempering pots or units 16 which are fed from a central source of supply (not shown) being connected thereto by pipe lines 17.

Inasmuch as the tempering pots or units 16 form no part of this invention, their structure has not been illustrated. It is to be observed, however, that each unit is equipped with a pump 18 for discharging the properly tempered chocolate onto its conveyor 13.

At the end of the upper stretch of each conveyor 13 the chocolate remaining thereon is removed by means of a scraper blade 19 or the like to discharge into a receptacle or hopper 20 which is connected with a pipe line 21 to return the chocolate back to the central source. In a large manufacturing establishment this central source may be located at a considerable distance from the enrobing apparatus and as will be readily apparent in such instances the necessary pumps are provided for conveying the chocolate through the distributing pipes. This distribution system, however, forms no part of this invention, for it is merely necessary to supply the tempering pots or units with chocolate and to return the chocolate which remains on the conveyors 13 at the end of their upper stretch to the source of supply for re-delivery to the tempering pots.

In this manner freshly and properly tempered chocolate is continuously available to all of the operators. This not only relieves the operators from the necessity of individual handling of trays and tempering equipment but also assures uniform results.

Another advantage of this invention resides in the fact that one of the conveyors 13 may be supplied with light or milk chocolate while the other is supplied with dark or bitter-sweet chocolate.

As stated the operators dip the pieces of candy or other confection into the streams of chocolate carried along by the conveyors 13 and place them on the conveyor 5. Each operator preferably dips one kind of candy or confection, and to facilitate packaging, complete assortments of the different kinds of candy or confection are kept segregated on the conveyor 5 by providing the same with suitable markings or indicia which divide the conveyor surface into separated sections or areas. In the embodiment illustrated, dividing lines 22 are delineated on the surface of the conveyor for this purpose.

Each section or area thus defined is adapted to hold a complete assortment if both conveyors 13 are carrying the same kind of chocolate. If light and dark chocolate are being used, one-half the sections or areas are loaded with pieces of confection enrobed with light, and the other half are loaded with pieces enrobed with dark chocolate. Hence, in packaging, mixed assortments may be readily assembled.

The packaging of the candy is done along the conveyor 11, and to facilitate such packaging, endless conveyors 23 are disposed at opposite sides of the conveyor 11 with their top stretches positioned to advance boxes to be filled along with the conveyor 11 and past rows of packaging operators who assemble the assortments into the boxes in layers.

From the foregoing description taken in connection with the accompanying drawings, it will be readily apparent that this invention provides a practical and highly desirable improvement in the method of and equipment for enrobing candy and other confections with chocolate, and that it effects a considerable saving in the cost thereof and assures uniform results.

While the foregoing description is directed primarily to a method of and apparatus for enrobing candy and confections with chocolate it is, of course, obvious that the same method and apparatus can be employed for other similar purposes as for instance the application of sugar coatings to bon bons and the like and it is to be understood that where the terms "coating" and "coating materials" are employed in the claims it is intended to cover not only chocolate but such other comparable coating materials.

What we claim as our invention is:

1. In an apparatus for enrobing candy and other confections with chocolate and other coating material the combination of: an elongated coating material carrier for supporting and conducting coating material linearly along a defined horizontal path through an enrobing zone in which candy centers are hand dipped into the coating material; and means for continuously discharging freshly tempered coating material directly onto said carrier in such volume that an exposed stream of tempered coating material is continuously carried away from the source and through the enrobing zone so that a plurality of operators stationed in said enrobing zone along the length of the carrier may dip pieces of candy and other confections into freshly tempered coating material to produce confections having the same coating characteristics.

2. In an apparatus for enrobing candy and other confections with chocolate, the combination of: an endless belt conveyor mounted to have its upper stretch travel along substantially a horizontal path through an enrobing zone the length of which is substantially equal to the length of the upper stretch of the conveyor; a chocolate tempering unit adjacent to one end of the enrobing zone and adapted to be fed with molten chocolate from a central source of supply; means for continuously discharging freshly tempered chocolate from said unit directly onto said upper stretch of the conveyor so that the chocolate is carried thereby away from the tempering unit to the end of the enrobing zone opposite the tempering unit as an exposed uninterrupted stream extending along said substantially horizontal path so that a number of operators stationed along the length of the conveyor may dip candy and other confections into the freshly tempered chocolate and whereby the pieces handled by all of the operators have the same coating characteristics; and means at said opposite end of the enrobing zone for receiving the chocolate from the conveyor at the end of the run of its upper stretch and for conducting said chocolate to the central source for return to the tempering unit.

3. An apparatus for enrobing candy and other of confections with chocolate and similar coatings comprising: a coating material tempering unit having an inlet and an outlet; an endless belt conveyor suitable for supporting tempered coating material for passage along a horizontal path through an enrobing zone of substantial length; means for continuously discharging tempered coating material in substantial volume from the outlet of the tempering unit directly onto the endless belt so that the tempered coating material is carried away from the tempering unit as an exposed uninterrupted stream of substantial depth; and means for continuously conducting the tempered coating material from the end of said stream back to the inlet of the tempering unit for retempering and redischarge onto the conveyor.

EDWARD C. JOHNSTON.
NEVIN J. RUSSELL.
ROBERT M. JAMESON.